I. REYNOLDS,
Assignor, by mesne assignments, to L. D. REYNOLDS.
Blank Book.
No. 9,503. Reissued Dec. 21, 1880.
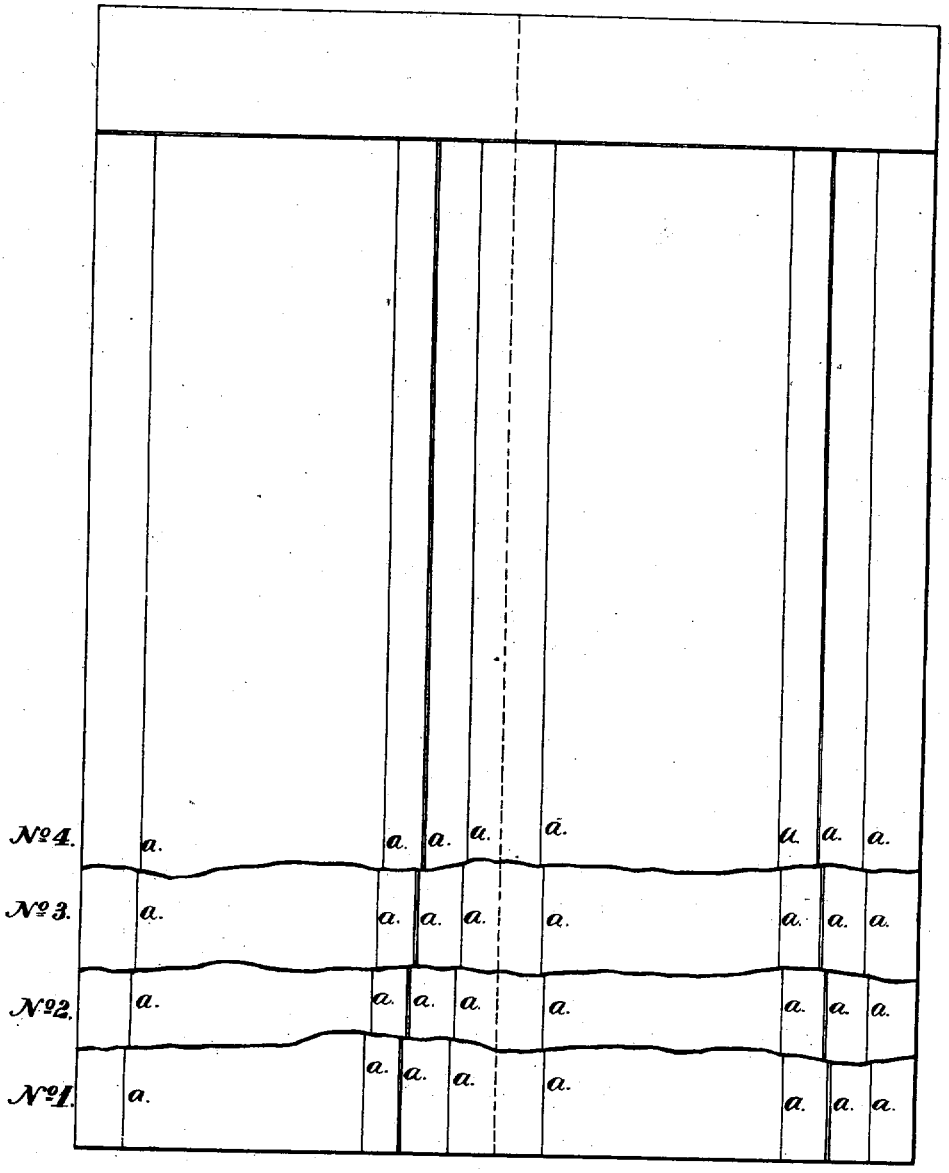
Witnesses;
Chas. M. Peck
John W. Kerchelvode
Inventor;
Ira Reynolds
N. PETERS, PHOTO-LITHOGRAPHER, WASHINGTON, D. C.

UNITED STATES PATENT OFFICE.

IRA REYNOLDS, OF DAYTON, OHIO, ASSIGNOR, BY MESNE ASSIGNMENTS, TO LUCIUS D. REYNOLDS.

BLANK-BOOK.

SPECIFICATION forming part of Reissued Letters Patent No. 9,503, dated December 21, 1880.

Original No. 164,873, dated June 22, 1875. Application for reissue filed July 3, 1879.

*To all whom it may concern:*

Be it known that I, IRA REYNOLDS, of the city of Dayton, in the State of Ohio, have invented a new and useful Improvement in Blank-Books; and I do hereby declare that the following is a full, clear, and exact description of the same, reference being had to the accompanying drawings, and to the letters of reference marked thereon, making part of this specification.

The object of my invention is to produce a cheap, durable, and convenient book for business men, as there has been and now exists a strong desire on the part of jobbers, shippers, and others for a book that can be folded back, so as to hold the same in the hand while writing. The ordinarily-constructed book does not answer the demand, as it will not readily fold back, and if the attempt is made the binding soon gives way, while with my improvement, combining the consecutive ruling with the strong outside cover-sheet and the book stitched through the center and all folded in one fold, the book will fold back so that the two sides of the cover shall lie flat together, and the whole book may be turned inside out and folded back without injury to the same, as the leaves simply turn upon the threads which hold the book and cover together.

My invention consists, substantially, in a book made of sections, composed of two or more sheets in each section, attached to a tough or durable flexible cover, each of the sections being ruled to suit the position it occupies in the book by graduating the outside down-ruled lines of the several sections toward the center or place where folded and stitched, thus forming in the complete book such consecutive ruling as that, when the book is closed, the ruled lines shall nearly cover each other and the outside margins shall be nearly or practically uniform in width, as will now be more particularly described.

In order to practice my improvement I make any number of consecutively-ruled diagrams (representing the sections) necessary to produce the desired size of book. These diagrams in consecutive ruling are only intended for what is called the "down ruling," as it is a well-known fact that in folding any number of sheets of paper the inside sheets must necessarily project. Therefore, in order to make a book of any considerable number of sheets with down ruling, it is obvious that the down ruling of the dollar and cent lines on the right-hand side of the book when opened, and the date or down line or lines on the left-hand side of the book when opened, must necessarily fall back in proportion to the projection of the sheets, or else the space for the cent-column on the right-hand side of the book and the date-space on the left-hand side of the book would be cut off or destroyed by trimming. Therefore, in order to produce a book cheaply that will fold back without injury, I have adopted the plan of consecutive ruling by sections, dividing the book into sections of, say, seven, nine, eleven, thirteen, or fifteen sheets, fifteen sheets being the supposed maximum of each section.

By way of illustration, suppose I wish to make a book containing four sections of fifteen sheets each. After folding the same and marking a register-line across the book-leaves, I select the middle sheet of each section, from which I draw diagrams of four sections, as hereunto annexed, and numbered 1, 2, 3, and 4, which show the exact differences between the centers of the several sections caused by folding the sheets. Of course the lines on the sheets above and below the center of each section will, when the section is folded, be at slightly-different distances to or from the center of such section; but this difference or variation is so slight that it does not interfere in the use of the down lines, and is not sufficiently perceptible to make the book objectionable. Therefore, by this process a book can be produced at less cost than by any other process known to me, and at the same time it is much more desirable as a cheap and convenient book or blotter for general use. The paper is ruled in accordance with the diagrams.

The several sheets desired to compose the book may be consecutively ruled from the outside to the center; but I prefer ruling in sections for the following reasons, namely: The trouble and expense of producing sixty diagrams for ruling each different kind of book would be too great, while the gathering would be very objectionable as well as expensive; but in ruling by sections the number of diagrams is greatly reduced, being only about one-twelfth as many. Consequently the gathering would be reduced in the same proportion.

It will be noticed that the diagrams 2, 3, and 4 (being second, third, and fourth from the outside) are cut away, so as to show the relative proportion of the receding of the lines as the leaves approach the center of the book.

In giving a general description of the construction of books with my improvement, I would say that after the sheets have been ruled, as above stated, in accordance with the diagrams, I take a strong Manila or other board of equal size with the paper. Then I gather the several sections required to make the desired size of book, commencing with section No. 1, that being the outside section. After the sheets are so gathered they are put into a clamp, which holds them in place and regulates the line of perforation for the stitches. The sheets and cover, having been stitched together, are then cut into sections or rows of sheets and covers sufficient for two or four books, as we make from four to twelve books from a gathered section of the consecutive numbers 1, 2, 3, and 4, and rule from four to twelve of these diagrams on each and every sheet, depending only on the size of the book to be produced. When the sheets and covers have been thus separated they are then folded, cover, sheets, and all. The books, having been thus folded, are finished to suit the market for which they are intended.

In the diagrams hereunto annexed, *a a a* represent the consecutive ruling above mentioned.

Having described the nature of my invention, what I claim, and desire to secure by Letters Patent, is—

A book folded in one fold and stitched through the center, made of sections of two or more sheets attached to a tough flexible cover, each of which sections is ruled to suit the position it occupies in the book by graduating the outside ruled down lines of each section toward the center or place where folded and stitched, forming in the complete book such consecutive ruling as that when closed the ruled lines will nearly cover each other and the outside margins be nearly or practically uniform in width, substantially as described.

Witness my hand this 12th day of June, A. D. 1879.

IRA REYNOLDS.

Witnesses:
CHAS. M. PECK,
P. H. GUNCKEL.